US011859640B2

(12) United States Patent
Loercher

(10) Patent No.: US 11,859,640 B2
(45) Date of Patent: Jan. 2, 2024

(54) HOUSING FOR A VENTILATOR AND VENTILATOR WITH A CORRESPONDING HOUSING

(71) Applicant: ZIEHL-ABEGG SE, Künzelsau (DE)

(72) Inventor: Frieder Loercher, Braunsbach (DE)

(73) Assignee: ZIEHL-ABEGG SE, Künzelsau (DE)

( * ) Notice: Subject to any disclaimer, the term of this patent is extended or adjusted under 35 U.S.C. 154(b) by 0 days.

(21) Appl. No.: 17/791,812

(22) PCT Filed: Dec. 4, 2020

(86) PCT No.: PCT/DE2020/200108
§ 371 (c)(1),
(2) Date: Jul. 8, 2022

(87) PCT Pub. No.: WO2021/143972
PCT Pub. Date: Jul. 22, 2021

(65) Prior Publication Data

US 2023/0032483 A1 Feb. 2, 2023

(30) Foreign Application Priority Data

Jan. 15, 2020 (DE) ......................... 102020200447.1

(51) Int. Cl.

| | |
|---|---|
| ***F04D 29/54*** | (2006.01) |
| ***F04D 19/00*** | (2006.01) |
| ***F04D 29/02*** | (2006.01) |
| ***F04D 29/16*** | (2006.01) |

(52) U.S. Cl.
CPC ......... *F04D 29/542* (2013.01); *F04D 19/002* (2013.01); *F04D 29/023* (2013.01); *F04D 29/164* (2013.01); *F05D 2250/52* (2013.01)

(58) Field of Classification Search
CPC .... F04D 29/542; F04D 19/002; F04D 29/023; F04D 29/164; F05D 2250/52
See application file for complete search history.

(56) References Cited

U.S. PATENT DOCUMENTS 6,270,313 B1 * 8/2001 Chuang ................. F04D 29/667 415/203
2015/0211545 A1 7/2015 Duong
2018/0372113 A1 * 12/2018 Tyner .................... F04D 29/663
2022/0316496 A1 * 10/2022 Froh ..................... F04D 29/526
2023/0184261 A1 * 6/2023 Tzeng ................... F04D 19/002 415/115

FOREIGN PATENT DOCUMENTS

| | | |
|---|---|---|
| CH | 714651 | 8/2019 |
| DE | 3141245 | 4/1983 |
| DE | 19860515 | 6/2000 |
| DE | 102004033977 | 2/2006 |

(Continued)

*Primary Examiner* — Aaron R Eastman
(74) *Attorney, Agent, or Firm* — FisherBroyles, LLP; Jason P. Mueller

(57) ABSTRACT

A housing for a fan, in an embodiment for an axial or diagonal fan, with the fan including an impeller and at least one flow-through region, wherein immediately downstream of the impeller or the blades of the impeller in an outer region of the housing and thus in the flow-through region, multiple individual, free-standing guide elements are provided. A fan includes a corresponding housing.

19 Claims, 7 Drawing Sheets

(56) References Cited

FOREIGN PATENT DOCUMENTS

| | | |
|---|---|---|
| DE | 202006016962 | 1/2007 |
| DE | 10330084 | 6/2010 |
| DE | 102012106412 | 1/2014 |
| DE | 202015105729 | 11/2015 |
| DE | 102017101590 | 8/2018 |
| DE | 102018211808 | 1/2020 |
| EP | 2333348 | 2/2018 |
| EP | 3321512 | 5/2018 |
| FR | 1432609 | 3/1966 |
| WO | 2016156043 | 10/2016 |

* cited by examiner

HOUSING FOR A VENTILATOR AND VENTILATOR WITH A CORRESPONDING HOUSING

CROSS-REFERENCE TO RELATED APPLICATIONS

This application is a national stage entry application under 35 U.S.C. 371 of PCT Patent Application No. PCT/DE2020/200108, filed on 4 Dec. 2020, which claims priority to German Patent Application No. 10 2020 200 447.1, filed on 15 Jan. 2020, the entire contents of each of which are incorporated herein by reference.

FIELD

The present disclosure relates to a housing for a fan, in an embodiment for an axial or diagonal fan, the fan including an impeller and at least one flow-through region. The disclosure also relates to a fan with such a housing.

BACKGROUND

Fans which include a drive, an impeller and a housing, in particular axial or diagonal fans, are well known from practice. In addition, it is known to provide such fans with guide blades, diffusers, multi-diffusers and combinations thereof in order to influence the flow. In particular, high static efficiencies are to be achieved.

SUMMARY

Although the disclosure relates very generally to a housing for a ventilator and a ventilator with such a housing, this disclosure relates in particular to a ventilator and a housing provided therein, as shown in terms of the basic structure in FIG. 1. For example, a fan 1 of axial design with a housing 2 is described. A guide device 15 can be made integral with the housing 2 by plastic injection molding. By way of example, it essentially comprises a hub ring 4, an outer ring 5, inner guide blades 3 extending there between and outer guide blades 3*a* which extend between the outer ring 5 and the housing 2. In the assembled state of the fan, this guide device 15 is arranged inside the housing 2 downstream of an impeller (not shown there), so that an air duct 6 is formed as the outer flow-through region between the guide device 15 or its outer ring 5 and the wall of the housing 2. Part of the air flowing out of the impeller is guided through this outer flow-through region or air duct. Another part of the air flowing out of the impeller is guided through an inner flow-through region 7 which, viewed in the direction of the span, is delimited towards the axis of the hub ring 4. Viewed toward the outer flow-through region 6, the inner flow-through region 7 is delimited by the outer ring 5. The inner flow-through region 7 is provided with inner guide blades 3, which stabilize the near-axis swirling flow exiting the impeller by reducing the swirl in the flow. This increases the efficiency. The hub ring 4 and the outer ring 5 run essentially over the entire circumference around the axis. The hub ring 4 surrounds an inner receiving region 8 in which, for example, the drive motor of the fan is arranged. The receiving region 8 does not have air flowing through it, or at most only a small volume flow of air, in order to be able to remove the waste heat originating from the engine. The outer flow-through region 6 has a small number of outer guide blades 3*a*, which in particular provide the static connection of the outer ring 5 to the housing 2. Due to the small number of outer guide blades 3*a* in the outer flow-through region 7, little additional noise is caused in this region as a result of the interaction of the flow emerging from the impeller with the outer guide blades 3*a*. In the region of the radial gap between the impeller and the housing 2 and downstream of it, a strongly swirling flow occurs, as a result of which flow separation occurs on the inner wall of the housing in the region of the impeller and downstream of it.

A return flow through the radial gap between the impeller and the housing reduces in particular the static efficiency and causes a not inconsiderable amount of noise. The inner guide blades 3 and the outer guide blades 3*a* are, in an embodiment, load-bearing guide blades, that is to say they have, among other things, the function of ensuring the supporting connection of the motor to the housing.

The present disclosure is based on the object of designing and developing the housing for such a fan, in an embodiment for an axial or diagonal fan, in such a way that the harmful effects of a so-called head gap leakage flow are at least reduced, if not largely eliminated. The effectiveness of downstream diffusers should be improved, and blockage effects in the form of a backflow region should be reduced. The problems occurring in the state of the art are to be solved with simple design means that distinguish both the housing according to the disclosure and the fan according to the disclosure from competitive products.

The object relating to the housing is achieved according to the disclosure by the features of claim 1. Accordingly, the generic housing is characterized in that multiple individual, free-standing guide elements are provided immediately downstream of the impeller or the blades of the impeller in an outer region of the housing. The object relating to the fan is achieved by the features of claim 18.

The features according to the disclosure appear astonishingly simple, according to which individual obstacles are provided downstream of the impeller and thus downstream of the blades of the impeller where head gap leakage flows or a backflow region can occur, specifically in an outer region of the housing, regardless of which concrete structural/constructive features the housing and the fan have. The obstacles are designed as individual free-standing guide elements, so they do not belong to a unitary or supporting guide device. They are to be understood as individual structural elements which are formed directly on or in the inner wall of the housing.

In concrete terms, it is conceivable that the individual free-standing guide elements are formed by a combination of depressions and elevations in the inner wall of the housing in order to achieve special flow effects. This measure enables an effective profiling of the inner wall of the housing with the help of free-standing guide elements.

In an embodiment the individual free-standing guide elements, viewed individually, are integrated into the inner wall of the housing. In this case, the housing can be produced using injection molding technology or cast metal with integral, individual, free-standing guide elements.

Alternatively, the individual free-standing guide elements, regardless of the material and the manufacture of the housing, may be formed of metal or plastic and are attached to the inner wall of the housing, for example by means of adhesives or welding.

In order to achieve a sufficiently good fluid-dynamic effect, a sufficiently large number of free-standing guide elements is provided, depending on the size of the housing, in the range between 20 and 100 pieces.

The individual free-standing guide elements can be arranged equidistantly from one another on the inner wall of the housing over the circumference of the inner wall of the housing. An equal distribution of the free-standing guide elements should bring about an effective stabilization of the otherwise swirling flow and/or redirect this flow more in the direction of flow. As a result, turbulence can also be removed more quickly from the impeller.

In an embodiment the position of the individual free-standing guide elements with supporting guide blades of a guide device alternates in terms of their position, in the circumferential direction, in such a way that between two supporting guide blades of the guide device, several individual free-standing guide elements, for example four to twelve free-standing guide elements, protrude radially, possibly obliquely at a predetermined angle from the housing wall. In any case, it is of importance that the individual free-standing guide elements are attached essentially directly downstream of the impeller and there counteract a backflow against the actual conveying direction.

The individual free-standing guide elements can be of identical design and protrude from the inner wall of the housing at an identical angle. It is also conceivable that the individual free-standing guide elements are aligned alternately with alternating angles and accordingly protrude from the inner wall of the housing in different directions.

Based on a particular housing, which has an essentially circular cross-section with an essentially cylindrical, possibly ring-like flow region, in which the impeller is arranged, it is advantageous if the individual free-standing guide elements are formed at the end of the cylindrical region or at the beginning of a subsequent, widening diffuser region or in the transition between the two regions. The immediate proximity to the impeller is of importance. The free-standing guide elements counteract any flow separations on the inner wall of the housing downstream of the impeller, resulting in a low-noise fan with high efficiency, namely as a result of flow stabilization by the individual free-standing guide elements on the inner wall of the housing. In addition, the provision of the individual free-standing guide elements improves the effectiveness of a diffuser which is integrated in the housing and can be connected to the aforementioned cylindrical region of the housing wall.

In concrete terms, it is advantageous if the individual free-standing guide elements extend radially away from the inner wall of the housing only slightly less or slightly more than an annular gap formed between the blades of the impeller and the inner wall of the housing. The ratio of the height of the individual free-standing guide element to the annular gap width can be in the range from 0.8 to 3.0. The axial distance of the individual free-standing guide element to the blade of the impeller is, in an embodiment, less than eight times the gap width on the housing wall.

The mere provision of the individual free-standing guide elements provides, in accordance with the above statements, an enormous contribution to stabilizing the otherwise swirling flow in the region downstream of the radial gap between the impeller and the housing. A further optimization is possible through the specific shape of the individual free-standing guiding elements. The individual free-standing guide elements can have a rather rounded leading edge and a rather thin, "pointed" tapered trailing edge.

Basically, it is advantageous if the individual free-standing guide elements have a profiled contour that corresponds approximately to the contour of an airfoil or an impeller blade. Such a measure also promotes the effect and thus stabilization of the flow.

Furthermore, it is advantageous if adjacent individual free-standing guide elements have a certain inclination, namely are aligned at a certain angle transversely to the longitudinal axis. It is in turn advantageous if free-standing guide elements adjacent in the circumferential direction, viewed in projection onto a plane perpendicular to the fan axis, do not overlap in the circumferential direction, or at least have a small distance from one another. This facilitates demolding from a casting tool, for example an injection molding tool.

At the free end, the individual free-standing guide elements can be designed differently, depending on the specific installation situation and sizing. The individual free-standing guide elements can have a blunt, angular, rounded, beveled or even free angled end, which has a significant influence on the air flow. Coordination with the overall structural situation is an advantage.

Furthermore, an underlying object in relation to the claimed fan, in an embodiment an axial or diagonal fan, is achieved by using a housing with features according to one of claims 1 to 17. Corresponding statements can be omitted by referencing the statements relating to the housing.

There are then various possibilities for advantageously designing and refining the teaching of the present disclosure. For this purpose, reference should be made on the one hand to the claims subordinate to claim 1 and on the other hand to the following explanation of exemplary embodiments of a fan according to the disclosure with reference to the drawings. In connection with the explanation of the exemplary embodiments of the disclosure with reference to drawings, embodiments and refinements of the teachings are also explained in general.

DETAILED DESCRIPTION OF THE DISCLOSURE

Figure 1:
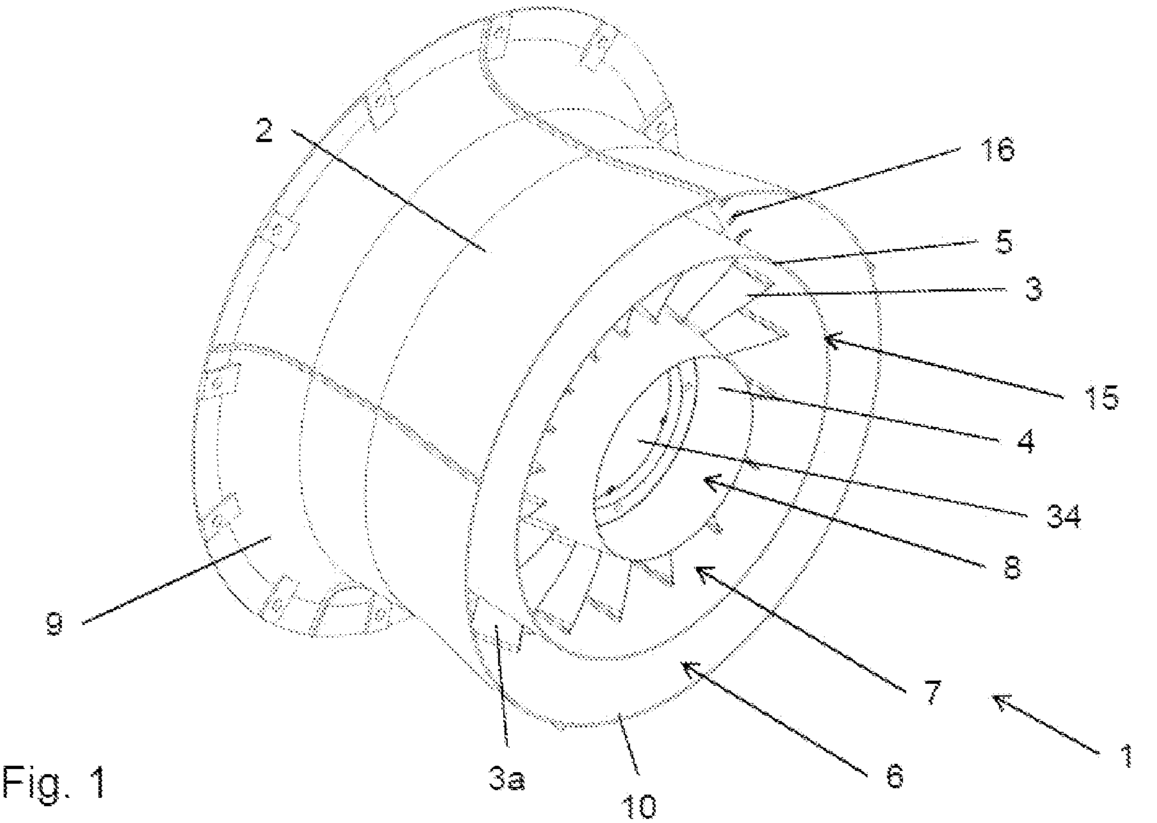
FIG. 1 shows a perspective view seen from the outflow side, of a fan of axial design with a housing according to the disclosure with individual free-standing guide elements.

FIG. 1 shows a perspective view of a fan 1 according to the disclosure of axial design with a housing 2. A guide device 15 is, in an embodiment, made integral with the housing 2 by plastic injection molding, and in the exemplary embodiment essentially consists of a hub ring 4, an outer ring 5, inner guide blades 3 extending in between and outer guide blades 3*a*, which extend between the outer ring 5 and the housing 2. In the assembled state of the fan according to the disclosure, this guide device 15 is arranged downstream of an impeller (not visible) within the housing 2, so that an air duct (outer flow-through region) 6 is created between the guide device 15 or its outer ring 5 and the wall of the housing 2, through which part of the air flowing out of the impeller is directed. Another part of the air flowing out of the impeller is guided through the inner flow-through region 7, which, seen in the span direction, is limited towards the axis by the hub ring 4, and which, seen in the span direction, is bounded towards the outer flow-through region 6 by the outer ring 5. The inner flow-through region 7 is traversed by inner guide blades 3 (in the exemplary embodiment 17 pieces, in an embodiment 9-23 pieces), which stabilize the swirling flow close to the axis exiting the impeller, by reducing the twist in the flow. This increases the efficiency. The hub ring 4 and the outer ring 5 run essentially over the entire circumference around the axis. The hub ring 4 surrounds an inner receiving region 8 in which, for example, the drive motor of the fan is arranged. The receiving region 8 is not traversed or is only traversed by a small air volume flow (0.1%-2% of the total air volume flow), in order to be able to remove the waste heat produced by the engine. The flow through the receiving region 8 can also take place counter to the main conveying direction, in particular if it is driven by a pressure difference between the outflow and inflow sides.

The outer flow-through region 6 has a small number of outer guide blades 3*a*, which in an embodiment provide the static connection of the outer ring 5 to the housing 2. Due to the small number of outer guide blades 3*a* in this region, little additional noise is caused in this region as a result of the interaction of the flow emerging from the impeller with the outer guide blades 3*a*. A large number of free-standing guide elements 16 are attached to the inner wall of the housing 2, in the exemplary embodiment 54 pieces, in another embodiment 30-100 pieces. They are, in an embodiment, integrally connected to the housing 2, for example by plastic injection molding. A metal casting is also conceivable. It is also conceivable that free-standing guide elements made of plastic or metal are glued, welded or the like into a housing. The free-standing guide elements 16 are attached in a region on the housing wall on the inflow side of the guide device 15, but can also overlap with it, as seen in the axial direction. It is of importance that the free-standing guide elements 16 are mounted essentially directly downstream of the impeller (not shown here) at a short distance, which is, in an embodiment, no greater than the axial extent of the corresponding free-standing guide element 16. They have a free end facing away from the wall of the housing 2 and protrude from the wall of the housing 2 at only a relatively small height. The free-standing guide elements 16 ensure stabilization of the, depending on the operating point, strongly swirling flow in the region downstream of the radial gap between impeller and housing 2 (see also FIG. 6 in particular) and thus help to prevent flow separation and/or turbulence on the inner wall of the housing in the region of the impeller and downstream of it, at least to reduce it, or to transport it away in an accelerated manner in the direction of flow.

Overall, a fan is obtained, which is quiet and has a high degree of efficiency, namely as a result of the flow stabilization or the flow acceleration in the direction of flow through the free-standing guide elements 16 on the wall of the housing 2, which in particular can improve the effectiveness of the outer diffuser 10 integrated in the housing 2.

Figure 2:
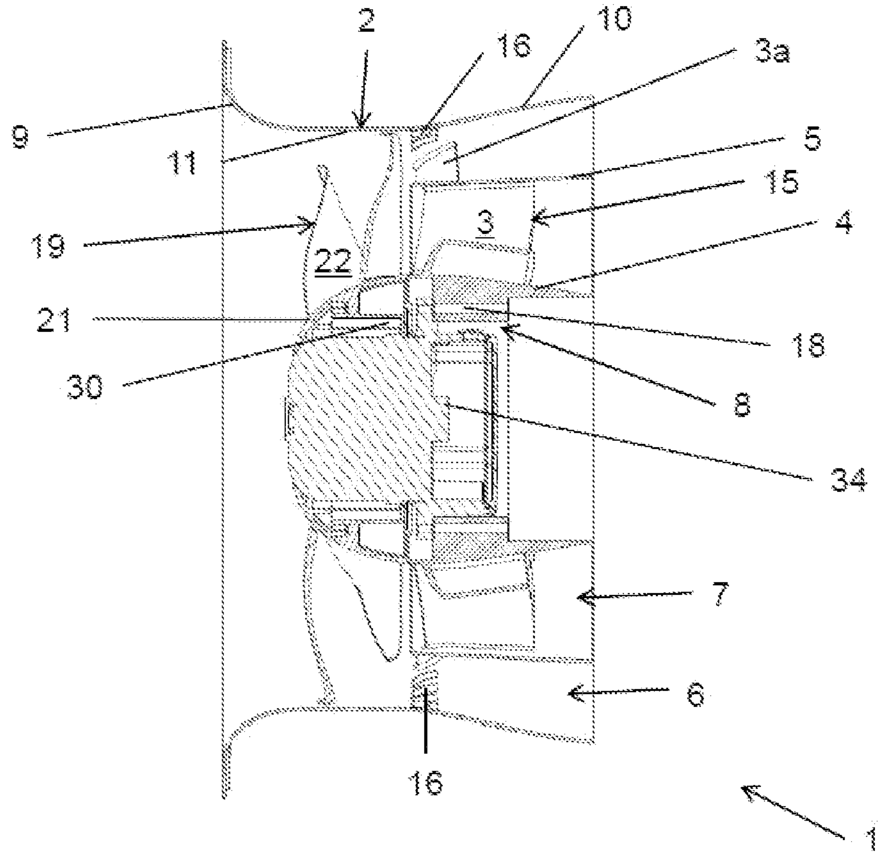
FIG. 2 shows a side view and a section on a plane through the axis, of the fan with the housing of the fan from FIG. 1.

FIG. 2 shows the fan 1 with the housing 2 according to the disclosure from FIG. 1 in a side view and in a section on a plane through the axis. The impeller 19, the motor 34 as well as the guide device 15 of the fan are readily seen. In a section through the guide device 15, the outer flow-through region 6 with the outer guide blades 3*a*, the inner flow-through region 7 with the inner guide blades 3 and a receiving region 8 within the hub ring 4 can be seen. The impeller 19 is arranged upstream of the guide device 15. When the fan 1 is in operation, the air flows approximately from left to right in this view, firstly through the inlet nozzle 9 integrated into the housing 2, then through the impeller 19 before it is divided into the outer flow-through region 6 and the inner flow-through region 7, in which the flow is stabilized by outer guide blades 3*a* and inner guide blades 3 (especially in the inner flow-through region 7) and in which kinetic energy of the flow is converted into pressure energy. In the exemplary embodiment, both the inner guide blades 3 and the outer guide blades 3*a*, in a section on a cylinder jacket coaxial to the fan axis, have an inflow edge angle on their inflow-side edge facing the impeller 19 that optimally matches the flow angle of the flow emerging from the impeller 19 and impinging on the outer guide blades 3*a* and the inner guide blades 3. The inflow edge angle measured relative to a plane through the axis is, in an embodiment, in a range between 20° and 70°. In an embodiment, the inner guide blades 3 and/or the outer guide blades 3*a* have a rounded inflow edge, and further include a variable thickness with a profile similar to that of an airfoil or a drop. The free-standing guide elements 16 are attached to the wall of the housing 2 in a front region of the guide device 15 in the flow direction or in front of the guide device 15. They stabilize the flow flowing from the impeller 19 which is subject to strong twisting in the region of the outer wall of the housing 2 and/or accelerate it in the direction of flow and prevent or reduce separation or turbulence. As a result, blockage effects of the outer flow-through region 6 that are harmful to the efficiency and the air output are prevented, or at least reduced, by large detachment regions.

There is a provision 18 for fastening a motor 34 in the region of the receiving region 8 within the hub ring 4. The motor 34, shown schematically, is attached thereto. The guide device 15 provides the connection of the motor 34 and, indirectly via this, also of the impeller 19 to the housing 2. The motor 34 is connected to the guide device 15 on the stator side. On the rotor side, the motor 34 is connected to the impeller 19 by a fastening provision 30. The impeller 19 consists essentially of a hub ring 21 and blades 22 attached thereto. The hub ring 21 is, in an embodiment, designed in such a way that the stagger angles of the blades 22 can be adjusted, depending on the needs of the ventilation application in which the fan 1 is used.

There are basically two different support concepts for the motor 34 with the impeller 19. On the one hand, as in the exemplary embodiment shown, a supporting guide device 15 can be provided. That is, a guide device 15 having an aerodynamic function connects the motor 34 to the housing 2 and supports it. On the other hand, the motor 34 can be attached to the housing 2 with a purely mechanical connection, for example consisting of rods, wire, flat material or the like. In such a case, a guide device 15 may or may not be provided.

In other exemplary embodiments, a guide device 15 can also be designed without an outer ring 5 and/or with only one type of guide blades, which are load-bearing.

It can be seen in FIG. 2 that supporting guide blades (here outer guide blades 3*a*) are arranged in the same region as the free-standing guide elements 16, viewed in the direction of flow. As a result, the free-standing guide elements 16 in the exemplary embodiment are not evenly distributed over the circumference, but are repeatedly interrupted by the outer guide blades 3*a*. In the exemplary embodiment, nine, or four to twelve, free-standing guide elements 16 are arranged between two outer guide blades 3*a* that are adjacent in the circumferential direction. In other embodiments, the free-standing guide elements 16 can also be distributed uniformly or in some other way non-uniformly over the circumference.

Figure 3:
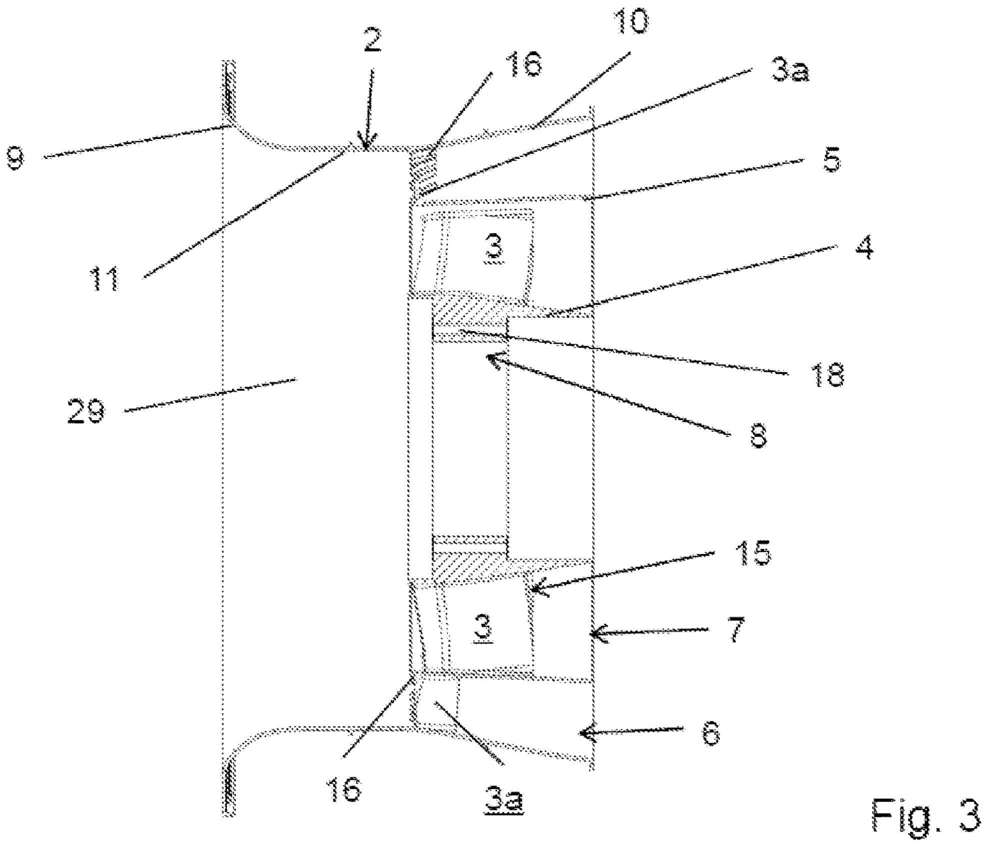
FIG. 3 shows a side view and a section on a plane through the axis, of the housing of the fan from FIGS. 1 and 2.

FIG. 3 shows the housing 2 of the fan 1 from FIGS. 1 and 2 in a side view and in a section on a plane through the axis. The outer flow-through region 6 with the outer guide blades 3*a* and the inner flow-through region 7 with the inner guide blades 3, separated by the outer ring 5, are easily recognizable.

In the exemplary embodiment, both the wall of the housing 2 and the hub ring 4 have a conical shape towards the outflow end. An outer diffuser 10 is thus integrated in the housing 2. Both the inner flow-through region 7 and the outer flow-through region 6 are designed towards their outflow end as diffusers with a widening flow cross section. This is very advantageous for the static efficiency, especially with axial fans. The outer ring 5 of the guide device 15 is also slightly conical in the embodiment, slightly widening radially in the direction of flow.

The inner flow-guiding wall of the housing 2 essentially has the contour of an inlet nozzle 9, which is followed by a cylindrical region 11, followed by the radially opening diffuser region 10. The impeller runs at least for the most part in the region 29 in the flow direction at the level of the cylindrical flow-through region 11. The free-standing guide elements 16 can be arranged at the end of the cylindrical region 11 or at the beginning of the diffuser region 10 or in the transition region between the two regions. In any case, the free-standing guide elements 16 are attached downstream of the impeller 19 or its blades 22 (see FIG. 2). For demolding the housing 2 from a casting tool, in particular a plastic injection molding tool, there are advantages if the free-standing guide elements 16 are arranged completely or largely in the cylindrical region 11. For an axial compactness of the fan, however, it can be advantageous if the free-standing guide elements 16 are arranged at least to a large extent in the diffuser region 10 since the diffuser region 16 can then directly adjoin the impeller 19.

On a housing 2 and/or a guide device 15, fastening provisions, for example fastening flanges, can be integrated or attached on both the inflow and outflow side, which provisions are used to fasten the fan to a higher-level system, for example an air conditioning system.

Figure 4:
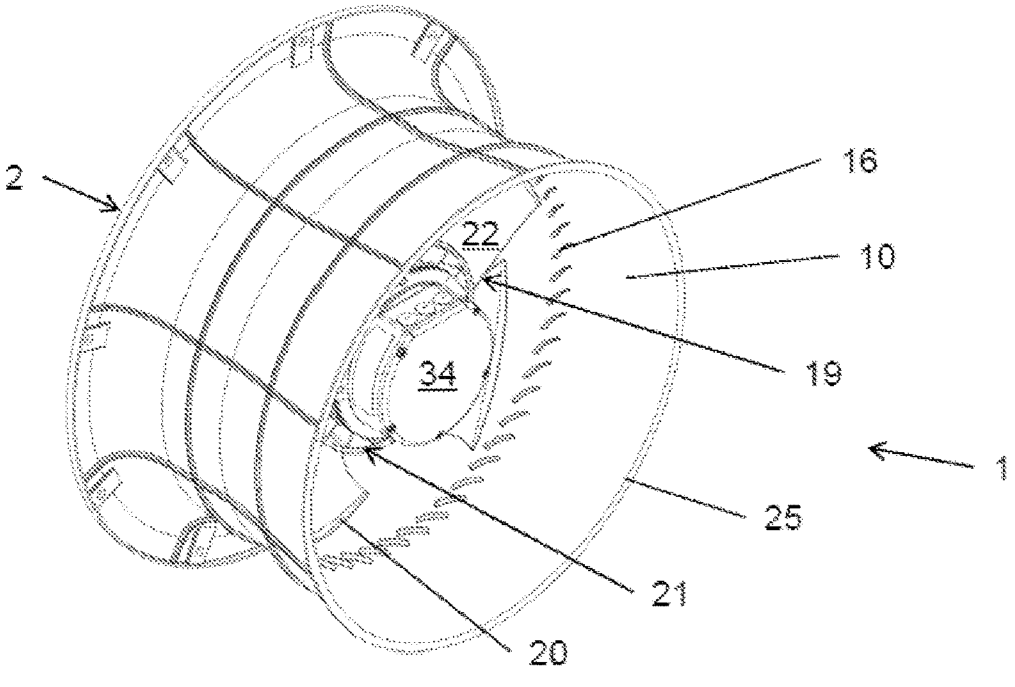
FIG. 4 shows a perspective view, seen from the outflow side, of a further embodiment of a fan with a housing according to the disclosure.

FIG. 4 shows a perspective view, seen from the outflow side, of a further embodiment of a fan 1 with a housing according to the disclosure. In this exemplary embodiment, no guide device is provided downstream of the impeller 19 with the blades 22. A support device (not shown here), for example made of rods or flat material, must establish the connection between the motor 34 and the housing 2 in order to fix the motor 34 relative to the housing 2. The free-standing guide elements 16 are distributed evenly over the circumference and run directly downstream of the impeller 22 or the outer ends of its blades 22 on the inner, flow-guiding wall of the housing 2. The housing 2 has an outflow-side edge 25 at the outflow-side end of the outer diffuser 10, from which the air flows out of the fan 1 during operation. The blades 22 are provided with so-called winglets 20 at their outer end, namely special geometric structures which positively influence the flow in the outer region of the blades 22 near the housing with regard to the noise emission of the fan 1 and/or with regard to its efficiency.

Figure 5:
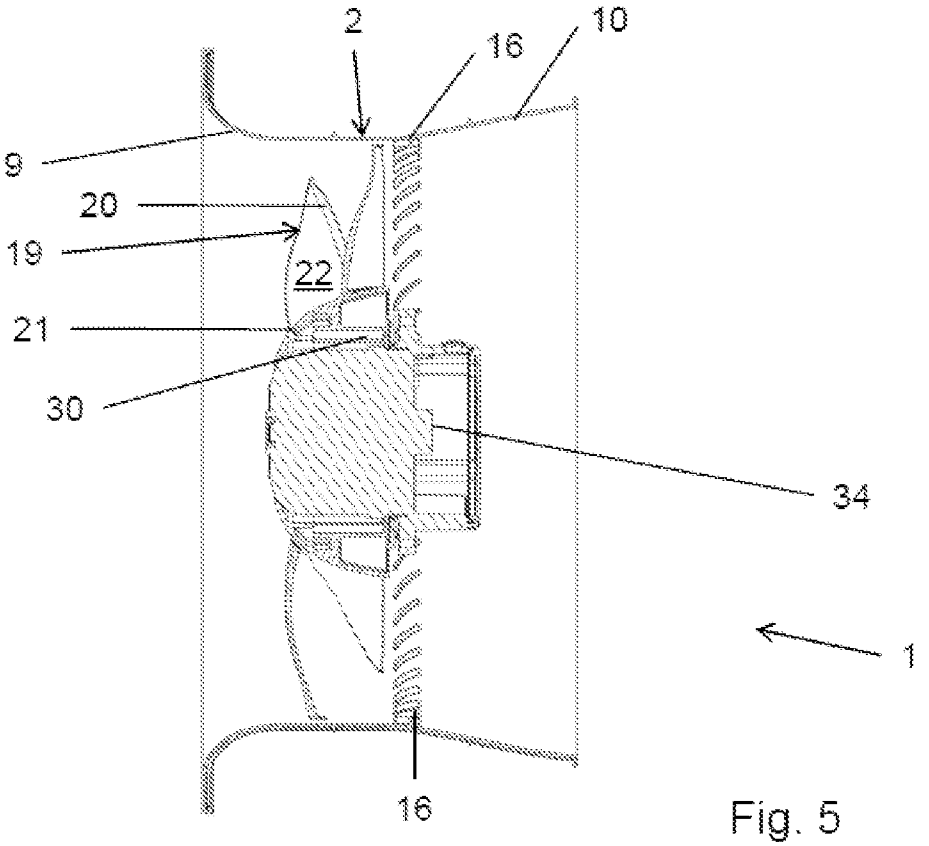
FIG. 5 shows a side view and a section on a plane through the axis, of the fan and the housing according to FIG. 4.

FIG. 5 shows the fan 1 with the housing 2 according to FIG. 4 in a side view and in a section on a plane through the axis. It can be seen, that the free-standing guide elements 16 are directly connected to the impeller 19 or its blades 22, which are attached to the hub 21 in the flow direction, essentially from left to right in the figure.

Figure 6:
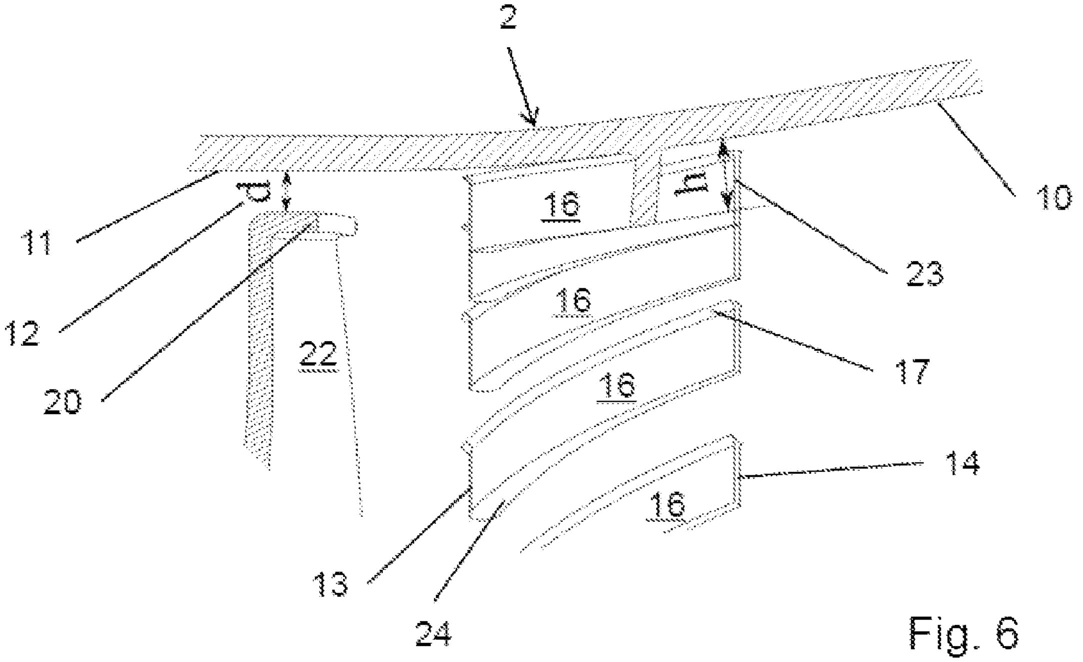
FIG. 6 shows a detailed view from FIG. 5, wherein the region of the free-standing guide elements is shown enlarged and provided with additional reference symbols.

FIG. 6 shows a detailed view of FIG. 5, the region of the free-standing guide elements 16 on the wall of the housing 2 being shown enlarged and provided with additional designations. A blade 22 of the impeller 19 with its winglet 20 can be seen at the radially outer end. The blades 22 run in the region of the cylindrical region 11 at a distance from the housing 2, so that a grazing of the impeller 19 is excluded during operation. As a result, a radial gap of width d 12 is formed between the blade 22 and the wall of the housing 2, through which a regular return flow (leakage flow) of air occurs counter to the actual flow direction. As a result, a flow region with very high velocity components in the circumferential direction and low velocity components in the flow direction is created locally near the wall of the housing 2 in the region of the blades 22. This flow region induces high flow losses and noise emissions, and in particular can lead to a blockage effect of a subsequent diffuser.

These losses can be significantly reduced by the free-standing guide elements 16, which run very close to the blades 22 downstream of the same. These free-standing guide elements 16 convert part of the velocity components in the circumferential direction into those in the axial direction, namely they direct the local flow more in the axial direction. This causes a reduction in the return flow region in the region of the radial gap with width d 12 and thus a reduction in the losses and the generation of noise as well as the (partial) blockage of a subsequent diffuser delimited to the outside by an outer diffuser 10.

The free-standing guide elements 16 run radially only very locally in the region of the radial gap of the impeller with the width d 12 or only by a small factor beyond this. In practice, the free-standing guide elements 16 have the height h 23, measured from the wall of the housing 2. The ratio of h 23 to d 12 is, in an embodiment, in the range of 0.8-3. The axial distance between the free-standing guide elements 16 and the blade 22 on the wall of the housing 2 is, in an embodiment, less than 8 times the gap width d 12.

In the exemplary embodiment, the free-standing guide elements 16 run in the region of the outer diffuser 10. In other embodiments, they can also run in the cylindrical region 11. If, as in the exemplary embodiment, they run in the region of the outer diffuser 10, demolding of a one-piece cast housing 2 is made more difficult. In an embodiment, special demolding regions (not shown) are incorporated, which allow demolding with an open-close tool with demolding directions parallel to the axis without additional slides.

According to the disclosure, the free-standing guide elements 16 deflect the strongly swirling flow in the region of the wall of the housing 2 more in the axial direction. Other geometric solutions are also conceivable in other embodiments, in which the free-standing guide elements are, for example, more integrated into the contour of the housing, for example in the form of depressions, elevations or the like. It is of importance that this flow influencing takes place only near the housing wall and in the immediate vicinity of the impeller blades, where an interaction with a leakage flow of a radial gap between the impeller blades and the housing takes place.

Figure 7:
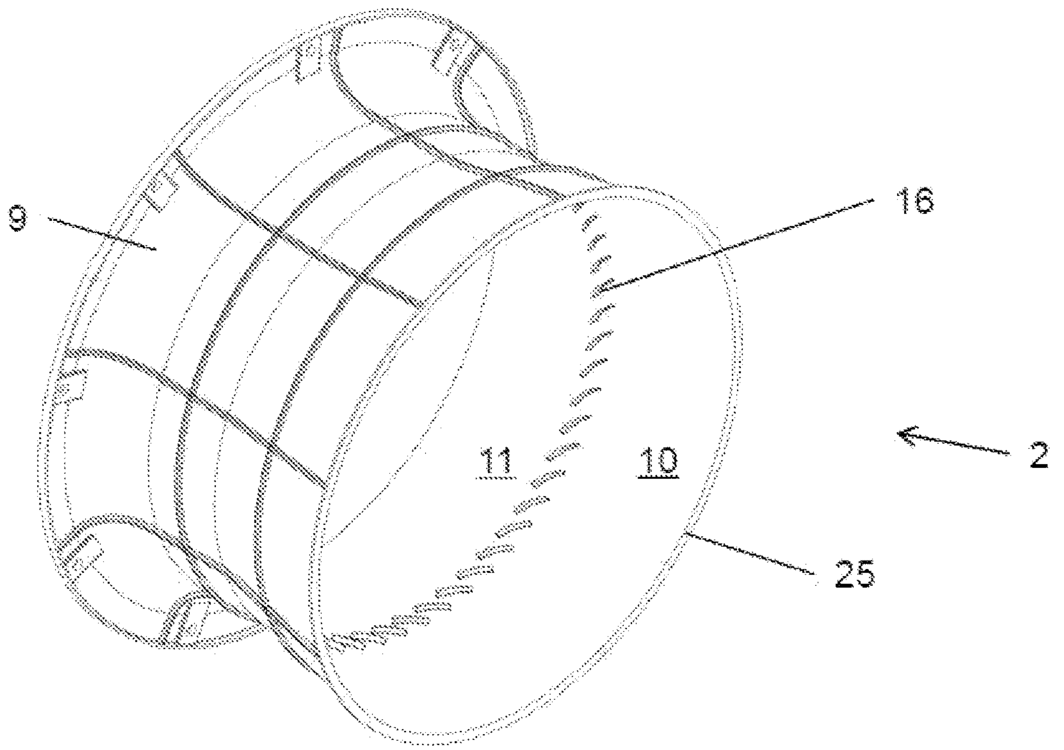
FIG. 7 shows a perspective view, seen from the outflow side, of a further embodiment of a housing according to the disclosure, which has no guide devices.

FIG. 7 shows a perspective view, seen from the outflow side, of a further embodiment of a housing 2 according to the disclosure, which has no guide devices. The free-standing guide elements 16 are here distributed approximately evenly over the circumference on the wall of the housing 2. On its flow-guiding inner wall, the housing 2 essentially has an inlet nozzle 9, a cylindrical region 11 and an outer diffuser 10, which ends at the outflow-side edge 25 of the housing 2.

Figure 8:
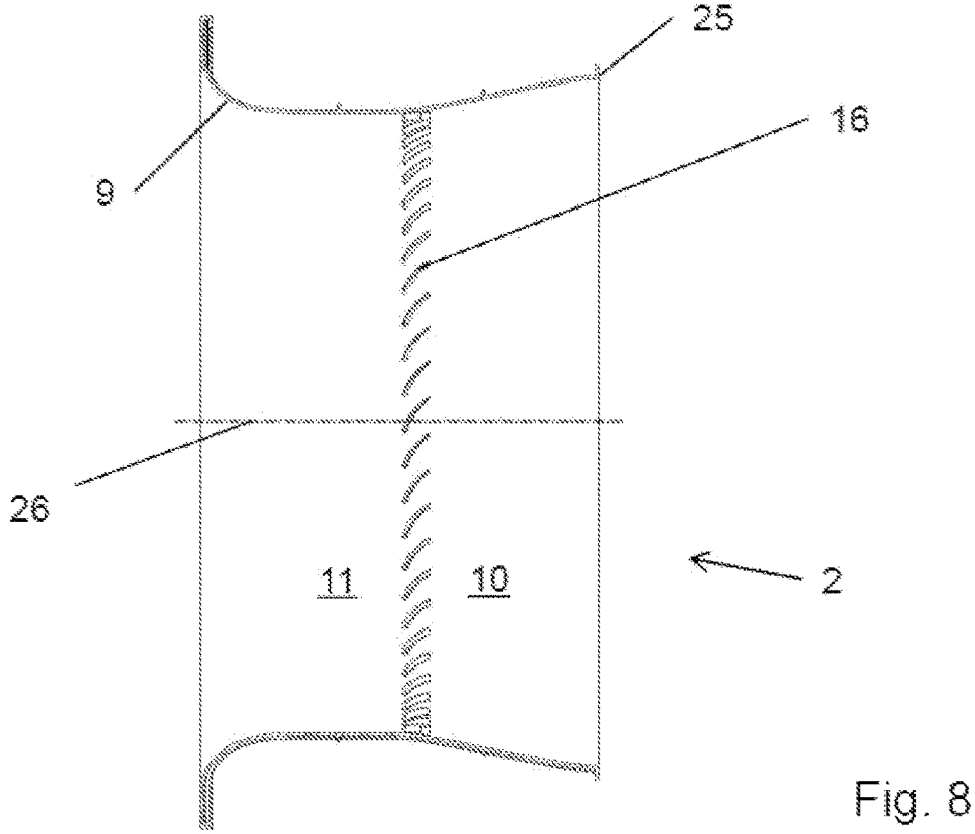
FIG. 8 shows a side view and a section on a plane through the axis, of the housing according to FIG. 7.

FIG. 8 shows a side view and a section on a plane through the axis 26, of the housing 2 according to FIG. 7. The free-standing guide elements 16 are approximately arranged in the transition region between the cylindrical region 11 and the outer diffuser 10, and this means that they extend across the boundary between the cylindrical region 11 and the outer diffuser 10, which is characterized in that, seen in the flow direction, it gradually widens radially. The one-sided opening angle of the contour of the outer diffuser 10 is approximately 12° in the exemplary embodiment, 6°-18°.

Figure 9:
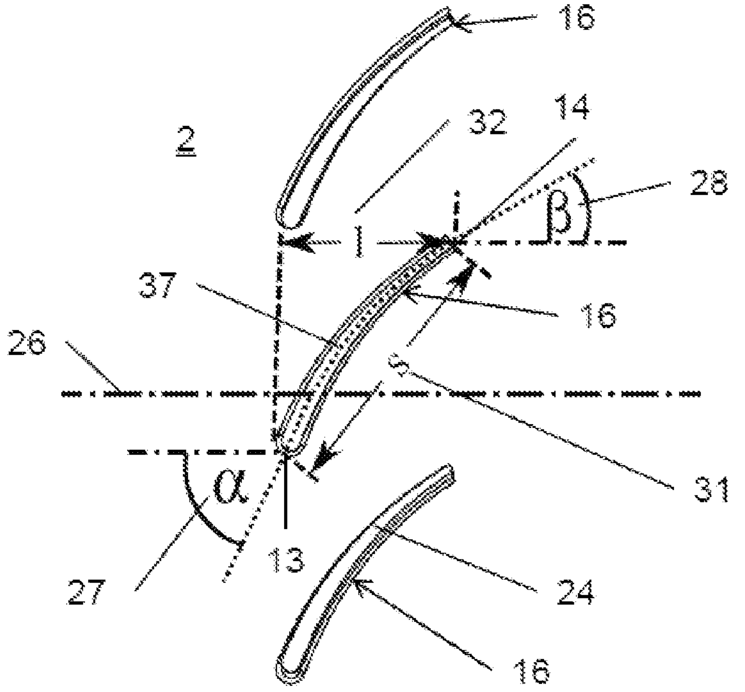
FIG. 9 shows a detailed view from FIG. 8 in the region of the fan axis, with a region of the individual free-standing guide elements being shown enlarged and provided with additional designations.

FIG. 9 shows a detailed view from FIG. 8 in the region of the fan axis, with a region of the individual free-standing guide elements 16 being shown enlarged and provided with additional designations. As a result of the high magnification and the view of an region close to the axis (in the projection shown), an approximately planar section of the wall of the housing 2 is shown.

The free-standing guide elements 16 have an inflow edge 13, which is, in an embodiment, at least approximately rounded, and an outlet edge 14, which is thin compared to the rest of the profile. Viewed in cross section, the free-standing guide elements 16 have approximately the profiled contour of an airfoil. In other embodiments, other cross-sectional contours are also possible, for example a thin contour with an essentially constant thickness. The free-standing guide elements 16 have a chord length s 31 and an axial extent I 32. In terms of values, I 32 is small, for example 0.2%-5% of the impeller diameter or 10%-60% of the axial extension of an impeller blade. The chord length s 31 is greater than I 32 by a factor of about 1.2-2. Viewed in the circumferential direction, adjacent free-standing guide elements 16 do not overlap, in order to enable easier demolding of the housing 2 from a casting tool. The inflow angle α 27 is assigned to the inflow edge 13. This is the local angle there between the chord 37 or its tangential extension and a line parallel to the axis 26. The outflow angle β 28 is assigned to the outflow edge 14. This is the local angle there between the skeleton line 37 or its tangential extension and a line parallel to the axis 26. The angle β 28 is smaller than the angle α 27, in an embodiment, by at least 20°. As a result, the swirling flow is more likely to be deflected in the axial direction. In this case the free-standing guide elements 16 have a front end 24.

Figure 10:
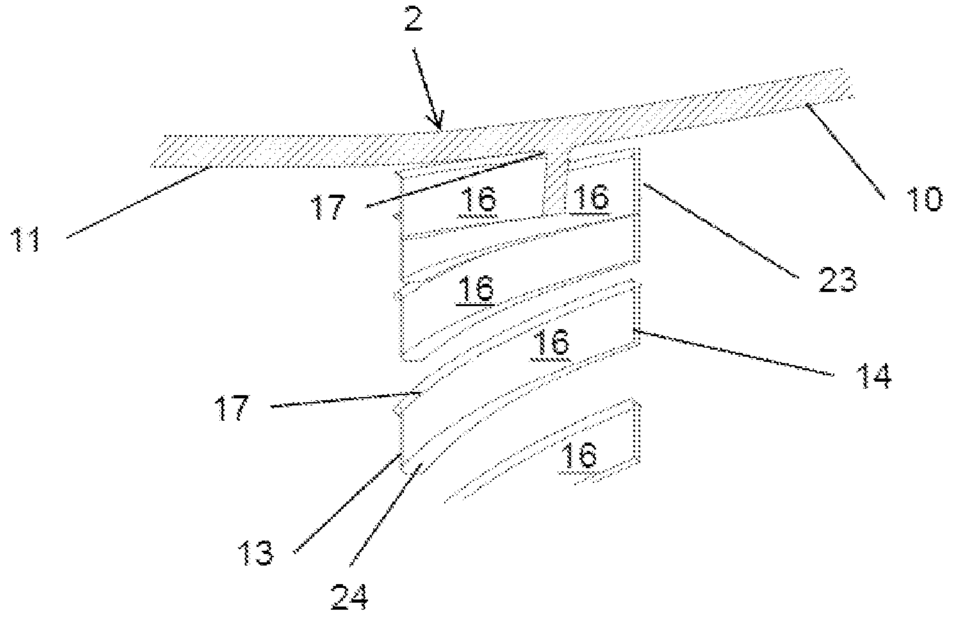
FIG. 10 shows a further detailed view from FIG. 8 in the region of the section through the housing wall at the top, with a region of the individual free-standing guide elements being shown enlarged and provided with additional designations.

FIG. 10 shows a further detailed view from FIG. 8 in the region of the section through the housing wall 2 at the top, with a region of the individual free-standing guide elements 16 being shown enlarged and provided with additional designations, The free-standing guide elements 16 have a blunt free end 24. In the cross section shown, viewed approximately along the height of the free-standing guide elements 16, the free-standing guide elements 16 have approximately the contour of a rectangle. However, a rounded transition region 17 to the wall of the housing 2 is formed.

Figure 11:
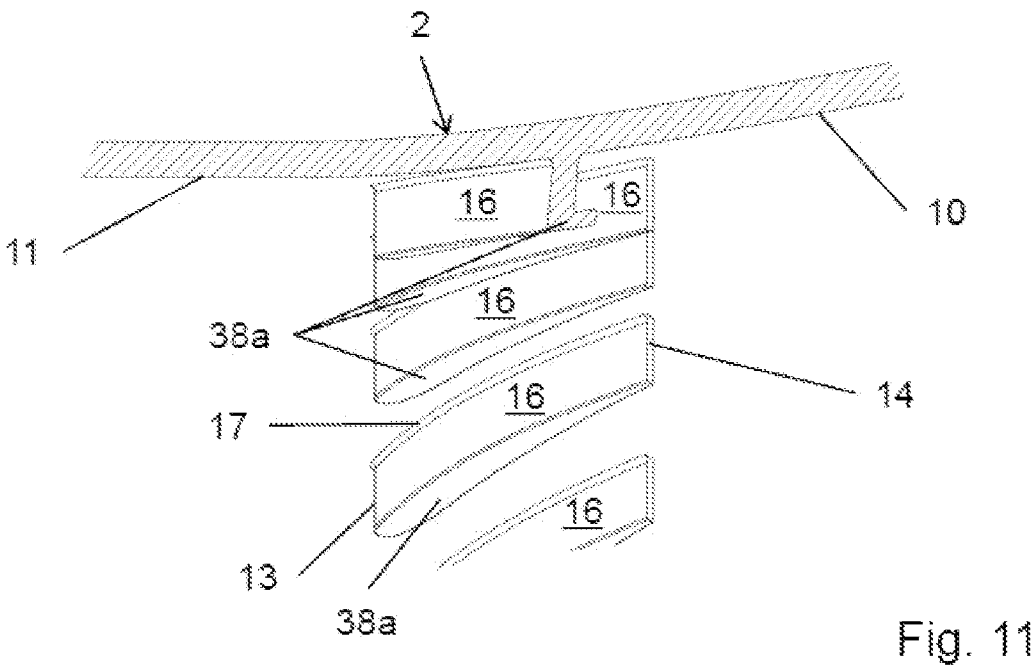
FIG. 11 shows a further embodiment of a housing according to the disclosure in a detailed view analogous to that according to FIG. 10, the individual free-standing guide elements being provided with a first type of winglets.

FIG. 11 shows a further embodiment of a housing 2 according to the disclosure in a detailed view similar to the embodiment according to FIG. 10, the free-standing guide elements 16 being provided with a first type of winglets 38*a* at their open end. At the free end of the free-standing guide elements 16, a contour with a thickness of 1 mm to 3 mm protrudes toward the concave side of the free-standing guide elements 16. In the cross section shown, viewed approximately along the height of the free-standing guide elements 16, the free-standing guide elements 16 have an approximately L-shaped contour.

Figure 12:
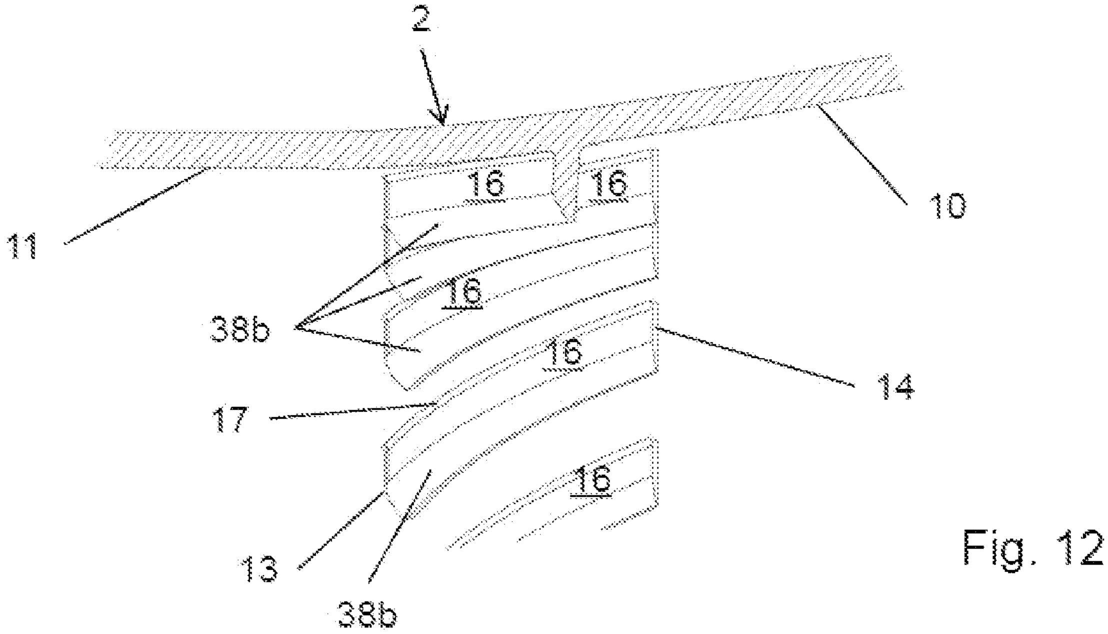
FIG. 12 shows a further embodiment of a housing according to the disclosure in a detailed view analogous to that according to FIG. 10, the individual free-standing guide elements being provided with a second type of winglets.

FIG. 12 shows a further embodiment of a housing 2 according to the disclosure in a detailed view similar to the embodiment according to FIG. 10, the free-standing guide elements 16 being provided with a second type of winglets 38*b* at their open end. On the convexly curved side of the free-standing guide elements 16, towards the free-standing edge, a type of chamfer is formed, so that the free-standing guide elements 16 taper approximately to a point towards their open end. At the outer end, however, the free-standing guide elements 16 are not completely pointed, but are provided with a very thin, finitely thick end.

Figure 13:
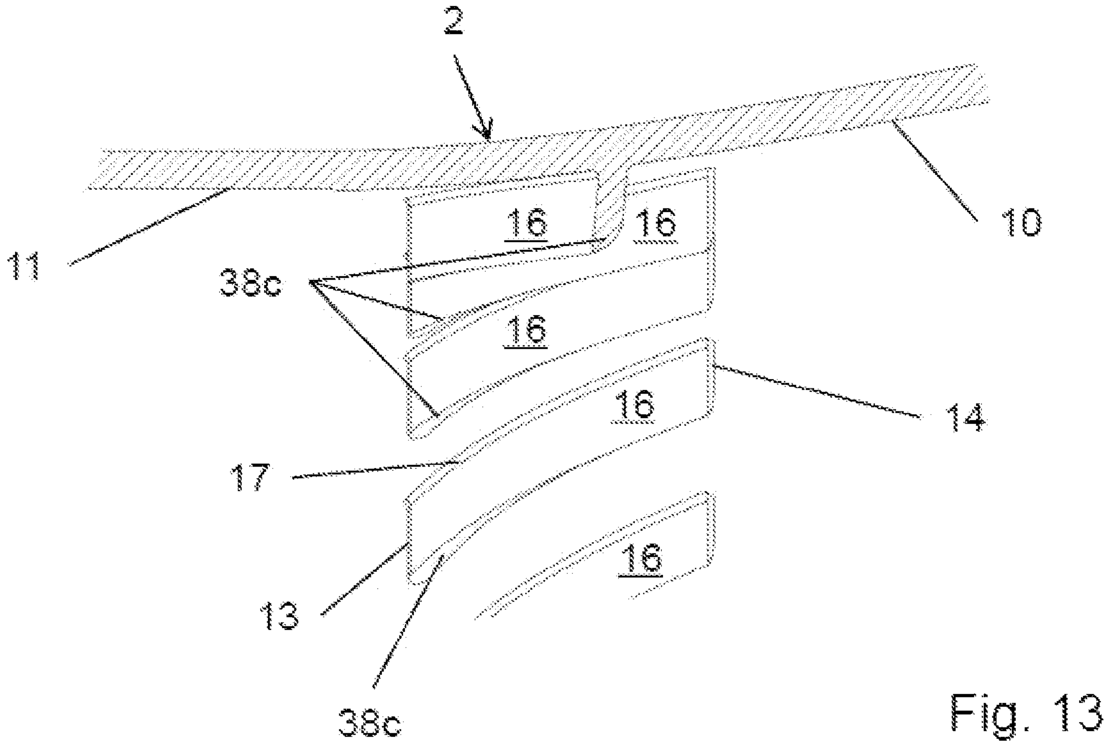
FIG. 13 shows a further embodiment of a housing according to the disclosure in a detailed view analogous to that according to FIG. 10, the individual free-standing guide elements being provided with a third type of winglets.

FIG. 13 shows a further embodiment of a housing 2 according to the disclosure in a detailed view similar to the embodiment according to FIG. 10, the free-standing guide elements 16 being provided with a third type of winglets 38*c* at their open end. On the concavely curved side of the free-standing guide elements 16, towards the free-standing edge, a type of rounding is formed, so that the free-standing guide elements 16 appear to have a quarter-circle rounding towards their open end. The edge to the convex side of the free-standing guide elements 16 remains at least approximately pointed.

To avoid repetition with regard to further embodiments of the fan according to the disclosure with the housing according to the disclosure, in order to avoid repetitions, reference is made to the general part of the description and to the appended claims.

Finally, it should be expressly noted that the above-described exemplary embodiments of the fan according to the disclosure and of the housing according to the disclosure are used solely to explain the claimed teaching, but do not restrict it to the exemplary embodiments.

LIST OF REFERENCE NUMERALS

1 fan
2 housing
3 inner guide blade
3*a* outer guide blade
4 hub ring, inner ring of the guide device
5 outer ring of the guide device
6 outer flow-through region

7 inner flow-through region
8 receiving region inside the hub ring
9 inlet nozzle
10 outer diffuser
11 cylindrical flow region of the housing
12 width d of the radial gap of the impeller
13 inflow edge of a free-standing guide element
14 outflow edge of a free-standing guide element
15 guide device
16 free-standing guide element
17 transition region of a free-standing guide element to the housing
18 fastening provision for motor on guide device
19 impeller
20 winglet of a blade of the impeller
21 hub ring of the impeller
22 impeller blades
23 height h of a free-standing guide element
24 front end of a free-standing guide element
25 outflow edge of the housing
26 axis of the fan
27 inflow angle α of a free-standing guide element
28 outflow angle β of a free-standing guide element
29 region for an impeller
30 provision for fastening the motor to the impeller
31 chord length s of a free-standing guide element
32 axial extension I of a free-standing guide element
34 motor
37 skeleton line of a free-standing guide element with tangential extension
38*a*, winglets of free-standing guide
38*b*, elements
38*c*

The invention claimed is:

1. A housing for a fan, comprising a fan having an impeller and at least one flow-through region, and multiple individual, free-standing guide elements immediately downstream of the impeller or blades of the impeller in an outer region of the housing, wherein the individual free-standing guide elements extend radially away from a housing inner wall by slightly less or slightly more than the width of an annular gap formed between the blades of the impeller and the housing inner wall, wherein the ratio of the height of the individual free-standing guide element to the width of the annular gap is in a range from 0.8 to 3.0 and wherein an axial distance of the individual free-standing guide element to a blade of the impeller on the housing inner wall is less than 8 times the width of the annular gap.

2. The housing of claim 1, wherein the individual free-standing guide elements are formed directly on or in the inner wall of the housing.

3. The housing of claim 1, wherein the individual free-standing guide elements radially extending away from the inner wall are separated by sections of the inner wall of the housing free of radially extending elements.

4. The housing of claim 1, wherein the individual free-standing guide elements are integrated into an inner wall of the housing.

5. The housing of claim 4, wherein the housing is made by plastic injection molding or metal casting with integral individual free-standing guide elements.

6. The housing of claim 1, wherein the individual free-standing guide elements are made of metal or plastic and are glued to an inner wall of the housing.

7. The housing of claim 1, wherein the number of individual free-standing guide elements is in a range of one of between 20 and 100.

8. The housing of claim 1, wherein the individual free-standing guide elements on a housing inner wall are arranged equidistantly from one another over the circumference of the housing inner wall.

9. The housing of claim 1, wherein the individual free-standing guide elements are distributed unevenly over the circumference of an inner wall of the housing.

10. The housing of claim 9, wherein the position of the individual free-standing guide elements alternates with supporting guide elements of a guide device in such a way that between two supporting guide blades of the guide device several individual free-standing guide elements are protruding radially from an inner wall of the housing.

11. The housing of claim 1, wherein the individual free-standing guide elements are of identical design and protrude from a housing inner wall at an identical angle.

12. The housing of claim 1, wherein the housing has a substantially circular cross-section with a substantially cylindrical flow region in which the impeller is arranged, wherein the individual free-standing guide elements are formed at the end of the cylindrical region or at the beginning of a subsequent, widening diffuser region or in the transition between the regions.

13. The housing of claim 1, wherein the individual free-standing guide elements have a rounded inflow edge and an outflow edge.

14. The housing of claim 1, wherein the individual free-standing guide elements have a profiled contour approximating an airfoil or an impeller blade, in a section on a cylinder jacket which is coaxial to an axis of the fan.

15. The housing of claim 1, wherein adjacent individual free-standing guide elements, seen in a projection onto a plane perpendicular to the fan axis, do not overlap or at least have a slight distance from one another.

16. The housing of claim 1, wherein the individual free-standing guide elements have a blunt, angular, rounded, beveled, or angled free end.

17. A fan, characterized by a housing with features according to any claim 1.

18. The housing of claim 1, wherein the number of individual free-standing guide elements is in a range of between 30 and 90.

19. The housing of claim 1, wherein the number of individual free-standing guide elements is in a range of between 40 and 70.

* * * * *